(12) United States Patent
Kotake et al.

(10) Patent No.: US 8,972,140 B2
(45) Date of Patent: Mar. 3, 2015

(54) DISC BRAKE APPARATUS

(71) Applicant: Hitachi Automotive Systems, Ltd., Ibaraki (JP)

(72) Inventors: Tomoyuki Kotake, Zama (JP); Hirotaka Oikawa, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 30 days.

(21) Appl. No.: 13/836,308

(22) Filed: Mar. 15, 2013

(65) Prior Publication Data

US 2013/0261917 A1    Oct. 3, 2013

(30) Foreign Application Priority Data

Mar. 30, 2012    (JP) .................... 2012-081535

(51) Int. Cl.
| G06F 7/70 | (2006.01) |
| B60T 13/74 | (2006.01) |
| F16D 65/18 | (2006.01) |
| F16D 121/02 | (2012.01) |
| F16D 121/24 | (2012.01) |
| F16D 123/00 | (2012.01) |

(52) U.S. Cl.
CPC ............ B60T 13/741 (2013.01); F16D 65/183 (2013.01); F16D 2121/02 (2013.01); F16D 2121/24 (2013.01); F16D 2123/00 (2013.01)

USPC .............................................. 701/70

(58) Field of Classification Search
USPC .............................................. 701/70
See application file for complete search history.

(56) References Cited

U.S. PATENT DOCUMENTS

| 8,561,762 B2* | 10/2013 | Schupska et al. ............ 188/72.4 |
| 2006/0219048 A1* | 10/2006 | Ueno ............................ 74/560 |
| 2009/0308698 A1* | 12/2009 | Park ................................ 188/17 |
| 2010/0072811 A1* | 3/2010 | Kondo et al. ................... 303/20 |
| 2010/0082213 A1* | 4/2010 | Taylor et al. .................... 701/76 |
| 2011/0203881 A1* | 8/2011 | Schemel et al. ............. 188/71.1 |

FOREIGN PATENT DOCUMENTS

JP    2003-83373    3/2003

* cited by examiner

*Primary Examiner* — Hussein A. Elchanti
(74) *Attorney, Agent, or Firm* — Wenderoth, Lind & Ponack, LLP (57) ABSTRACT

A disc brake apparatus, in which, at the time of a parking brake release operation, a control unit configured to control driving of an electric motor drives the electric motor so as to cause a piston holding mechanism to stop holding a piston, detects separation of a brake pad from a disk, and then stops driving the electric motor after driving the electric motor by a predetermined amount based on a current value of the electric motor.

19 Claims, 8 Drawing Sheets

DISC BRAKE APPARATUS

BACKGROUND OF THE INVENTION

1. Technical Field

The present invention relates to a disc brake apparatus equipped with a parking brake mechanism.

2. Background Art

Japanese Patent Public Disclosure No. 2003-83373 discloses a disc brake apparatus equipped with a parking brake mechanism, which controls parking brake by an electric motor. The disc brake apparatus disclosed in Japanese Patent Public Disclosure No. 2003-83373 is configured so as to perform a parking brake release operation to release a parking brake applied state in response to, for example, a switch operation of a driver. The release operation is set to end by stopping a rotation of the electric motor when a predetermined time has elapsed from the switch operation as a time period in which the motor is driven to rotate in a release direction to retract a thrust member (a ramp body), which thrusts a piston.

However, according to the disc brake apparatus disclosed in Japanese Patent Public Disclosure No. 2003-83373, a constant time is set as a time period in which the electric motor is driven to rotate during the parking brake release operation. Therefore, it is difficult to appropriately set the motor rotation driving time for the release operation due to a mechanical structural variation in the dimension and a temperature characteristic. In particular, according to the disc brake apparatus disclosed in Japanese Patent Public Disclosure No. 2003-83373, a rotational amount of the motor may be insufficient or excessive during the parking brake release operation. For example, in a case where the electric motor rotates excessively, a too much clearance amount is generated between the piston and the thrust member. Therefore, this exceedance leads to a problem of the necessity of a longer time at the time of the next parking brake application operation. On the other hand, in a case where the electric motor rotates by an insufficient amount, the piston and the thrust member cannot secure a sufficient clearance amount therebetween. Therefore, this shortage leads to a problem of occurrence of a so-called drag, i.e., such a phenomenon that, even when the piston is supposed to be retracted via the brake pad according to a face deflection of the disc rotor while the vehicle is running, the piston is blocked from being retracted by the thrust member, resulting in the disc rotor and the brake pad maintained in contact with each other.

SUMMARY OF THE INVENTION

The present invention has been contrived in consideration of the above-described problems, and an object of the present invention is to provide a disc brake apparatus capable of securing an appropriate clearance amount between a piston and a thrust member at the time of an end of a parking brake release operation.

According to an aspect of the present invention, a disc brake apparatus includes a caliper configured to press brake pads disposed on respective surfaces of a disc by a piston disposed in a hydraulic cylinder, a piston thrust mechanism disposed at the caliper and including a thrust member configured to thrust the piston by an electric motor, a piston holding mechanism configured to hold the thrust piston, and a control unit configured to control driving of the electric motor. The control unit detects that the brake pad is separated from the disc after driving the electric motor to cause the piston holding mechanism to step holding the piston, and then stops driving the electric motor after driving the electric motor by a predetermined amount based on an electric current value of the electric motor.

According to another aspect of the present invention, a disc brake apparatus includes a caliper configured to press brake pads disposed on respective surfaces of a disc by a piston disposed in a hydraulic cylinder, an electric parking brake mechanism disposed at the caliper, and configured to thrust the piston by an electric motor and hold the thrust piston, and a control unit configured to control driving of the electric motor. The control unit detects that the brake pad is separated from the disc after driving the electric motor to cause the piston holding mechanism to stop holding the piston, and then stops driving the electric motor after driving the electric motor by a predetermined amount based on an electric current value of the electric motor.

According to still another aspect of the present invention, a disc brake apparatus includes a caliper configured no press brake pads disposed on respective surfaces of a disc by a piston disposed in a hydraulic cylinder, an electric mechanism disposed at the caliper, and configured to move the piston toward, the disc and move the thrust piston away from the disc by an electric motor, and a control unit configured to control driving of the electric motor. When the control unit moves the piston away from the disc, the control unit stops driving the electric motor after driving the electric motor by a predetermined amount based on an electric value of the electric motor after the brake pad is separated from the disc.

DETAILED DESCRIPTION OF THE INVENTION

Figure 1:
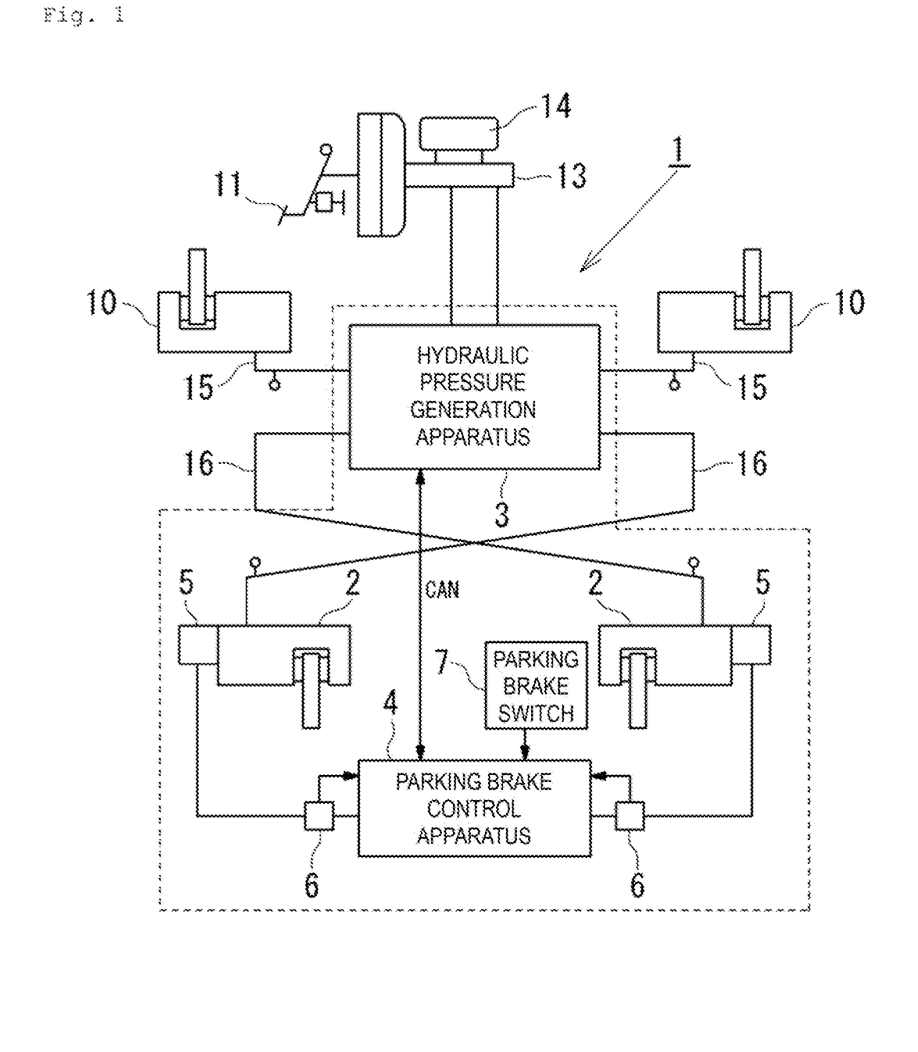
FIG. 1 is a schematic view of a brake system to which a disc brake apparatus according to embodiments of the present invention is mounted.

Hereinafter, embodiments of the present invention will be described in detail with reference to FIGS. 1 to 9. FIG. 1 illustrates a brake system to which a disc brake apparatus 1 according to the embodiments of the present application is mounted. As illustrated in FIG. 1, the disc brake apparatus 1 includes disc brakes 2 and 2 each equipped with a parking brake configured to generate a brake force at a rear wheel, and a parking brake control apparatus 4 as a control unit to control the parking brake. As a whole, the brake system includes, in addition to the disc brake apparatus 1, disc brakes 10 and 10 each configured to generate a braking force at a front wheel, a master cylinder 13 configured to generate a hydraulic pressure in response to pressing of a brake pedal 11 by a driver's brake operation, a reservoir 14 configured to store brake fluid to be supplied to the master cylinder 13, a hydraulic pressure generation apparatus 3 configured to supply the brake fluid to the disc brakes 10 and 10 and the disc brakes 2 equipped with the parking brakes, and brake fluid passages 15 and 16 connecting the front wheel-side disc brakes 10 and 10 and the rear wheel-side disc brakes 2 and 2 equipped, with the parking brakes to the hydraulic pressure generation apparatus 3.

An electric parking brake mechanism 37, which is actuated by an electric motor 5, is disposed at the disc brake 2 equipped with the parking brake. The electric motor 5 is controlled by the parking brake control apparatus 4. Motor current detectors 6 and 6, which detect current values supplied to the electric motors 5 and 5, are disposed at the parking brake control apparatus 4. A parking brake switch 7, which detects a parking brake request from a driver, is electrically connected to the parking brake control apparatus 4. The parking brake control apparatus 4 is configured to perform control that will be described below in response to a brake application signal for maintaining a parked state or a brake release signal for stopping a parked state from the parking brake switch 7.

Figure 2:
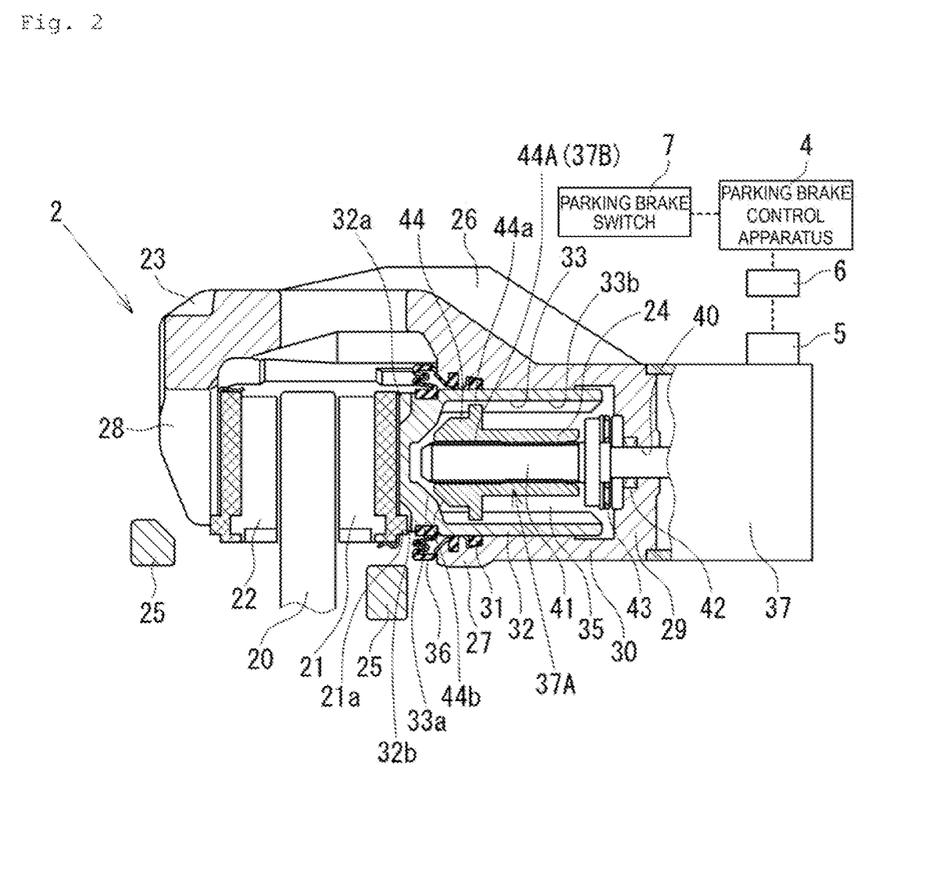
FIG. 2 is a cross-sectional view of the disc brake apparatus according to the embodiments of the present invention.

As illustrated in FIG. 2, the disc brake 2 equipped with the parking brake includes a pair of inner and outer brake pads 21 and 22 disposed at the respective sides of a disc rotor 20 with the disc rotor 20 sandwiched between the inner and outer brake pads 21 and 22, and a caliper 23 configured to generate a brake force by pressing the inner and outer brake pads 21 and 22 against the respective surfaces of the disc rotor 20. The disc brake 2 equipped with the parking brake is configured as a caliper floating type disc brake. Therefore, the pair of inner and outer brake pads 21 and 22, and the caliper 23 are supported by a carrier 25 fixed to a non-rotatable portion (for example, a knuckle) of a vehicle so as to be movable in an axial direction of the disc rotor 20. The disc brake 2 equipped with the parking brake may be configured as a caliper fixed type disc brake.

The caliper 23 includes a caliper main body 26, and a piston 32 contained in the caliper main body 26. The caliper main body 26 includes a cylinder portion 27 formed at a proximal side racing the inner brake pad 21, which is located at a vehicle inner side relative to the disc rotor 20. The caliper main body 26 further includes a claw portion 28 formed at a distal side facing the outer brake pad 22, which is located at a vehicle outer side relative to the disc rotor 20. A bottomed cylinder 30 is formed at the cylinder portion 27. One end of the cylinder 30 that faces the inner brake pad 21 is an opening end, and the other end of the cylinder 30 is closed by a bottom wall 29.

The piston 32 is slideably disposed in the cylinder 30 via a piston seal 31. The piston 32 has a cup shape including a concave portion 33 formed inside the piston 32. The piston 32 is contained in the cylinder 30 in such a manner that an outer bottom portion 32a of the piston 32 faces the inner brake pad 21. Further, a groove portion 32b, which is engaged with a protrusion portion 21a protruding from the inner brake pad 21 in the axial direction of the disc rotor, is formed at the outer bottom portion 32a. The groove portion 32b is engaged with the protrusion portion 21a of the inner brake pad 21, by which the piston 32 is prevented from rotating relative to the caliper main body 26. An inner bottom portion 33a is formed at the concave portion 33 of the piston 32. A thrust member 44, which will be described below, is configured to abut against the inner bottom portion 33a. Further, axial groove portions 33b are formed on an inner circumferential surface of the concave portion 33. The axial groove portions 33b function to prevent a relative rotation from being generated between the piston 32 and the thrust member 44, which will be described below.

A space within the cylinder 30 between the piston 32 and the bottom wall 29 of the cylinder 30 is defined as a hydraulic pressure chamber 35. A hydraulic pressure is supplied from the master cylinder 13 via the hydraulic pressure generation apparatus 3, and is introduced from a flow inlet (not illustrated) formed at the cylinder portion 27 into the hydraulic pressure chamber 35. Further, a dust boot 36, which prevents an entry of a foreign object into the cylinder 30, is disposed between an cuter surface of the piston 32 and the cylinder 30.

The electric parking brake mechanism 37 is disposed at the bottom side of the cylinder 30 of the caliper main body 26 with the bottom wall 29 of the cylinder 30 sandwiched between the piston 32 and the electric parking brake mechanism 37. The electric parking brake mechanism 37 includes a piston thrust mechanism 37A configured to thrust the piston 32, and a piston holding mechanism 37B configured to hold a position of the thrust piston 32 with even the electric motor 5 out of operation.

The piston thrust mechanism 37A includes a spindle 41 and a thrust member 44. The spindle 41 includes a male screw portion at a distal side thereof. A rotational force of a speed reducing mechanism (not illustrated), which increases a rotational force from the electric motor 5, is transmitted to a proximal side of the spindle 41. The thrust member 44 includes a female screw portion configured to foe screwed with the spindle 41, and is contained within the concave portion 33 of the piston 32.

The spindle 41 extends into the cylinder 30 from an opening portion 40 formed through the bottom wall 29 of the cylinder 30, and is disposed along an axis of the cylinder 30 within, the cylinder 30. A seal member 42, which provides seal between the opening portion 40 and the spindle 41, is disposed on an inner circumferential surface of the opening portion 40. This seal member 42 maintains liquid-tightness of the hydraulic pressure chamber 35 in the cylinder 30. The spindle 41 is rotatably supported by a needle bearing (a thrust bearing) 43 disposed at the bottom wall 29 of the cylinder 30.

A plurality of radially protruding protrusion portions 44a is formed at an outer circumference of the thrust member 44. The protrusion portions 44a are engaged with the axial grooves 33b formed on the inner circumferential surface of the concave portion 33 of the piston 32, respectively. This engagement prevents the thrust member 44 from rotating relative to the piston 32, and allows the thrust member 44 to be supported by the piston 32 so as to be movable in the axial direction, i.e., linearly movable according to a rotation of the spindle 41 to thrust the piston 32. An abutment portion 44b, which can abut against the inner bottom portion 33a of the piston 32, is formed at the thrust member 44. The abutment portion 44b is formed into a substantially conical shape, and is configured to thrust the piston 32 by abutting against the mortar-shaped inner bottom portion 33a. A space of a predetermined clearance amount is formed between the abutment portion 44b and the inner bottom portion 33a during a normal brake operation or while the brake is not applied, except when the electric parking brake mechanism 37 is in operation. The predetermined clearance amount is set by retracting the thrust member 44 to a predetermined position when the parking brake is released. If the retraction amount of the thrust member 44 is too large at this time, this will increase a time required to apply the parking brake at the next time. On the other hand, if the retraction amount of the thrust member 44 is too small, the piston 32 cannot be retracted by being blocked by the thrust member 44 when the piston 32 is supposed to be retracted via the inner brake pad 21 according to a face deflection of the disc rotor 20 while the vehicle is running, as a result of which the disc rotor and the brake pad are brought into contact with each other, i.e., a so-called drag occurs. In the present embodiment, the clearance amount between the piston 32 and the thrust member 44 is adjusted appropriately by control that will be described below.

The piston holding mechanism 37B is constituted by the spindle 41 and a threaded portion 44A of the thrust member 44. The threaded portion 44A is configured to have so-called low reverse operability in such a manner that the thrust member 44 can linearly move according to a rotational force of the spindle 41 but the spindle 44 cannot rotate according to an axial force applied to the throat member 44. Therefore, to maintain a parked state by the parking brake, the piston 32 thrust by the piston thrust mechanism 37A is maintained at that position by the threaded portion 44A, which is a part of the piston holding mechanism 37B.

In the present embodiment, the piston holding mechanism 37B is constituted by the threaded portion 44A having low reverse operability, but is not limited thereto. The piston holding mechanism 37B may be realized by any mechanism capable of preventing a rotation of a speed reduction mechanism or the like in a release direction when the parking brake is in operation but allowing a rotation of the speed reduction mechanism or the like in the release direction according to a rotation of the electric motor 5 in the release direction upon, a release of the parking brake, such as a ratchet mechanism or a worm gear.

When the disc brake 2 equipped with the parking brake is used as a normal brake, i.e., a service brake, the disc brake 2 functions as follows. When a driver operates the brake pedal 11, a hydraulic pressure is supplied from the master cylinder 13 into the hydraulic pressure chamber 35 in the cylinder 30 of the disc brake 2 equipped with the parking brake via ports provided, at the hydraulic pressure generation apparatus 3 and the cylinder portion 27. At this time, the electric motor 5 stops operating, so the thrust member 44 screwed with the spindle 41 does nor move in the axial direction, and the piston 32 moves forward (moves toward the disc rotor 20) to push the inner brake pad 21 against the disc rotor 20 while elastically deforming the piston seal 31 according to an increase of the hydraulic pressure. A reaction force of the pressing force of the piston 32 causes the caliper main body 26 to move toward the vehicle inner side to push the outer brake pad 22 against the disc rotor 20 via the claw portion 28, thereby generating a brake force according to the hydraulic pressure.

On the other hand, when the operation of the brake pedal 11 is released, the hydraulic pressure is released from the hydraulic chamber 35 of the disc brake 2 equipped with the parking brake. Then, the piston 32 is retracted due to an elastic recovery force of the piston seal 31, according to which the pair of inner and outer brake pads 21 and 22 move away from the disc rotor 20, thereby releasing the brake force.

Next, when the disc brake 2 equipped with the parking brake is used as a parking brake, the disc brake 2 functions as follows. To maintain a parked state by the parking brake, the parking brake switch 7 is operated to an application side. Then, the parking brake control apparatus 4 drives the electric motor 5 to rotate the spindle 41 in an application direction. This rotation of the spindle 41 in the application direction causes the thrust member 44 to move linearly (move forward) to abut against the bottom of the concave portion 33 of the piston 32, thereby moving the piston 32 and the thrust member 44 as a single unit. As a result, a brake force (a parked state maintaining force) is generated in a similar manner to the normal brake operation. Then, the parking brake control apparatus 4 stops the electric motor 5 upon generation of a predetermined brake force. As a result, the disc brake 2 equipped with the parking brake maintains the piston 32 by the piston holding mechanism 37B in such a state that a predetermined brake force is generated, thereby actuating the parking brake. At this time, the piston seal 31 in abutment with the piston 32 is elastically deformed according to the forward movement of the piston 32, but the elastic deformation amount is small compared to the elastic deformation amount at the time of the normal, brake operation, since a hydraulic pressure is not added to the piston seal 31 unlike the above-described normal brake operation.

On the other hand, to release the parking brake, the parking brake switch 7 is operated to a release side. Then, the parking brake control apparatus 4 rotates the electric motor 5 in the release direction. At the disc brake 2 equipped with the parking brake, the piston holding mechanism 37B releases its holding of the piston 32, and the spindle 41 rotates in the release direction to thereby retract the thrust member 44. Due to this retraction of the thrust member 44, after that, the thrust member 44 returns to its original position, and the electric motor 5 stops rotating in the release direction at the same time, thereby releasing the parking brake. At this time, the piston 32 is retracted to a position corresponding to a recovery of the elastic deformation of the piston seal 31.

When the parking brake is released, release control according to the first to third embodiments is performed, which will be described below. A routine of a control flow according to each of the first to third embodiments continues until completion of a release of the parking brake, i.e., release completion is determined, and a brake operation status is set into an unlocked state.

First Embodiment

Figure 3:
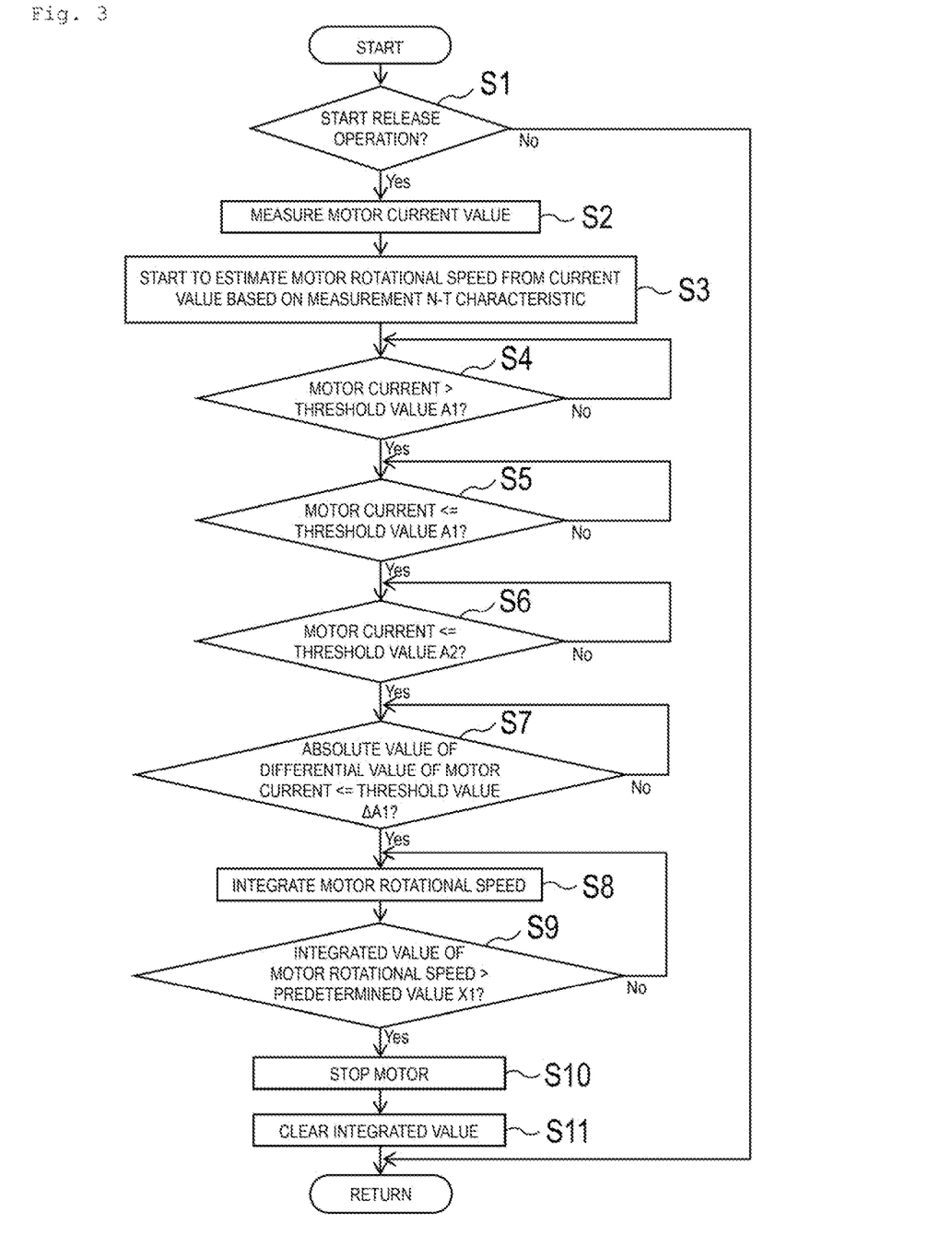
FIG. 3 is a control flowchart illustrating a release operation according to a first embodiment of a parking brake control apparatus.

A control flow by the parking brake control apparatus 4 according to the first embodiment to acquire an appropriate clearance amount between the piston 32 and the thrust member 44 at the time of a release of the parking brake will be described in detail with reference to FIG. 3. This control flow is performed when the brake operation status of the parking brake control apparatus 4 is in a locked state.

First, in step S1, the parking brake control apparatus 4 determines whether the parking brake switch 7 is pushed to the release side and a release operation (an operation for driving the electric motor 5 to rotate in the release direction) of the parking brake should be started. If this condition is satisfied, a current value is supplied to rotate the electric motor 5 in the release direction. After that, the processing proceeds to step S2, in which the brake operation status is set into a release ongoing state. On the other hand, if the condition is not satisfied in step S1, the routine is ended with the parking operation status maintained in the locked state.

Figure 4:
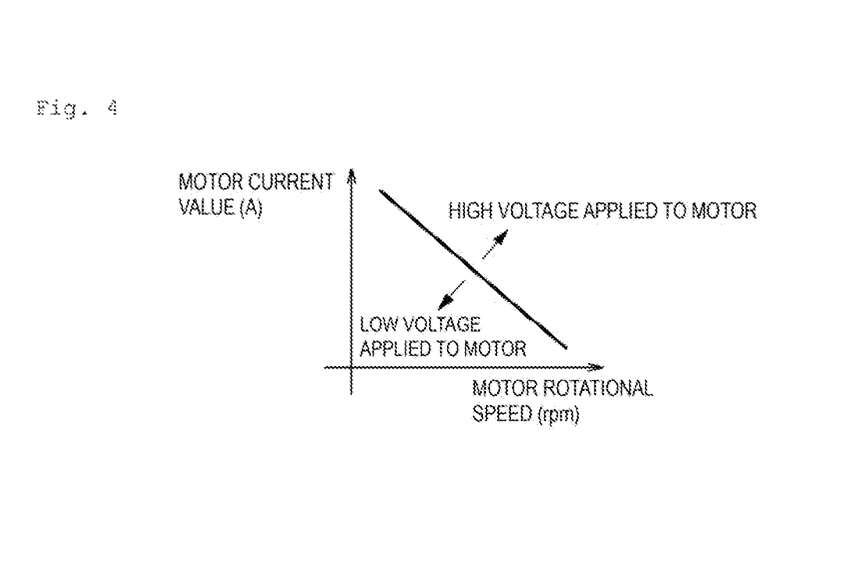
FIG. 4 is a graph including a line indicating a characteristic of an electric motor with respect to a relationship between the number of rotations (rotational speed) of the electric motor and an electric current value (torque) of the electric motor.

In step S2, the motor current value detector 6 starts to measure a current value supplied to the electric motor 5. After that, the motor current value detector 6 measures the current value at predetermined intervals. In step S3, the parking brake control apparatus 4 starts to sequentially estimate a motor rotational speed from the measured motor current value. The parking brake control apparatus 1 estimates the motor rotational speed based on a graph (N-T characteristic line graph) including a line indicating a characteristic with respect to a relationship between the motor rotational speed and the motor current value (torque) illustrated in FIG. 4. The above-described N-T characteristic line graph varies depending on a voltage applied to the electric motor 5 as illustrated in FIG. 4, and the parking brake control apparatus 4 measures a voltage applied to the electric motor 5 when estimating the above-described motor rotational, speed. Then, the parking brake control apparatus 4 selects the N-T characteristic line graph according to the measured voltage, and estimates the motor rotational speed from the selected N-T characteristic line graph. In other words, the motor rotational speed is calculated based on the current value while being corrected according to a voltage applied to the electric motor. Another possible method for estimating the motor rotational speed is, for example, to monitor a current ripple of a brush, which is generated when a motor of a brush motor rotates, and measure the ripple.

In step S4, the parking brake control apparatus 4 determines whether the motor current value exceeds a threshold value A1, and repeats this determination of step S4 until this condition is satisfied. If the condition is satisfied, the processing proceeds to step S5. In step S5, the parking brake control apparatus 4 determines whether the motor current value reaches or fails below the threshold value A1, and repeats this determination of step S5 until this condition is satisfied. If the condition is satisfied, the processing proceeds to step S6. As indicated by a motor current value A and a motor position F in a time chart of FIG. 5, the electric motor 5 does not rotate immediately even if the current value is supplied thereto, and requires a current value of a certain degree, i.e., a current value equal to or larger than the threshold value A1 to rotate. Then, once the electric motor 5 starts to rotate, the current value reduces to reach or fail below the threshold value A1. The parking brake control apparatus 4 detects that the electric motor 5 has started to rotate by the processes of steps S4 and S5. Further, as the above-described threshold value A1, a value slightly smaller than a current value for causing the electric motor 5 to start a rotation is set from an experiment or the characteristic of the electric motor 5.

Next, in step S6, the parking brake control apparatus 4 determines whether the motor current value reaches or falls below a threshold value A2. The parking brake control apparatus repeats the determination of step S6 until this condition is satisfied. If the condition is satisfied, the processing proceeds to step S7. The threshold value A2 is a current value smaller than the above-described threshold value A1 but slightly larger than a current value when at least one of the pair of inner and outer brake pads 21 and 22 is separated from the disc rotor 20. The current value when the brake pad 21 or 22 is separated from the disc rotor 20 is calculated from an experiment in advance, and a slightly larger current value is set as the threshold value A2 in consideration of an error.

In step S7, the parking brake control apparatus 4 determines whether an absolute value of a differential value (a change amount) of the measured motor electric value (hereinafter referred to as a current differential absolute value) reaches or fails below a predetermined value $\Delta A1$. In the present embodiment, a value "0" is set as the predetermined value $\Delta A1$, so the parking brake control apparatus 4 determines whether the current differential absolute value is 0. The parking brake control apparatus 4 repeats the determination of step S7 until this condition is satisfied. If the condition is satisfied, the processing proceeds to step S8. When the determination result indicates satisfaction of the condition in step S7, the parking brake control apparatus 4 determines that at least one of the pair of inner and outer brake pads 21 and 22 is separated from the disk rotor 20 (the brake force is released). As the electric motor 5 continues rotating in the release direction, and at least one of the pair of inner and outer brake pads 21 and 22 is separated from the disc rotor 20, almost no load is applied to the rotation of the electric motor 5 anymore. Therefore, the motor current value becomes a no-load current value, and 0 or a value close to 0 is continuously output as the current differential absolute value. A value of 0 is set as the above-described predetermined value $\Delta A1$ to detect that no load is applied to the rotation of the electric motor 5 anymore (a dead zone may be provided in consideration of an error).

Next, in step S8, the parking brake control apparatus 4 integrates the motor rotational speed after the current differential absolute value reaches 0 (equal to or lower than the predetermined value $\Delta A1$), and calculates the integrated value. Then, in step S9, the parking brake control apparatus 4 determines whether the integrated value of the motor rotational speed, which is calculated in step S8, exceeds a predetermined value X1. The parking brake control apparatus 4 repeats the calculation of step S8 and the determination of step S9 until the condition in step S9 is satisfied. If the integrated value of the motor rotational speed exceeds the predetermined value X1 to satisfy the condition in step S9, the processing proceeds to step 10, in which the parking brake control apparatus 4 stops the electric motor 5. After that, in step S11, the parking brake control apparatus 4 clears the integrated value of the motor rotational speed. At this time, the parking brake control apparatus 4 determines that the release operation is completed, and the brake operation status of the parking brake control apparatus 4 is set into the unlocked state. The above-described predetermined value X1 is an integrated value of the motor rotational speed corresponding to a movement amount of the thrust member 44 required for the piston 32 to move by a distance equal to or longer than a rollback amount of the piston 32. More specifically, the predetermined value X1 is set as a value corresponding to a clearance amount between the piston 32 and the thrust member 44 sufficient to prevent a drag of the pad from occurring in consideration of a predetermined rollback amount of the piston 32 by the piston seal 31 to which a hydraulic pressure is applied during a normal brake operation (an amount by which the piston 32 is retracted by the elastic recovery force of the piston seal 31), a maximum value of a thermal expansion amount generated when the inner and outer brake pads 21 and 22 are heated, and a maximum value of a face deflection amount of the disc rotor 20 while the vehicle is running. The integrated value may be any value corresponding to integration, and may be measured by, for example, using a low-pass filter having a large time constant.

Figure 5:
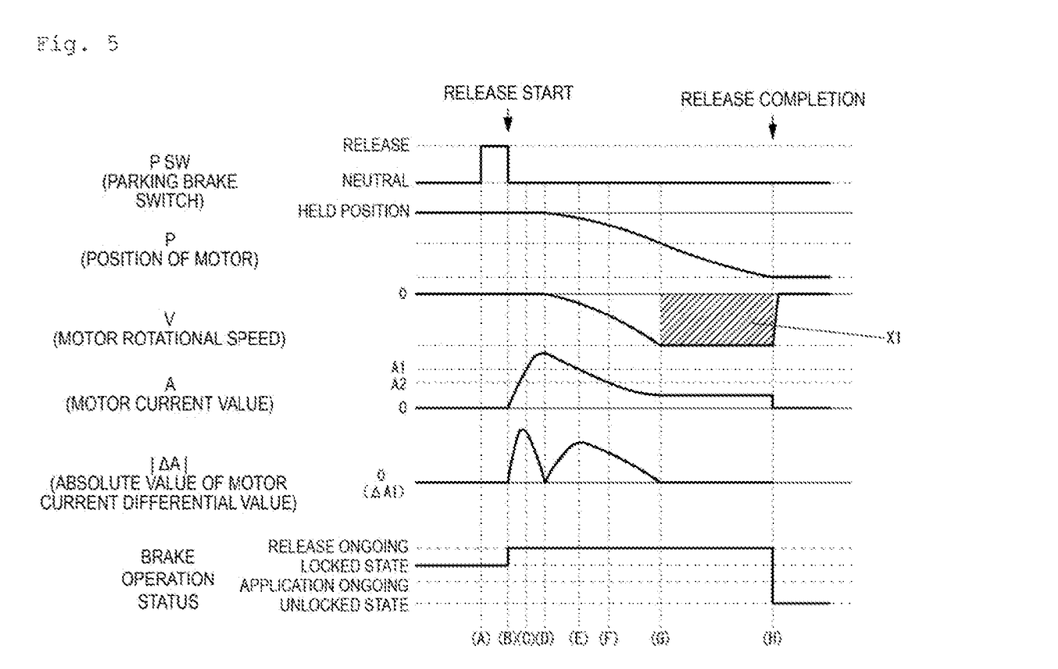
FIG. 5 is a time chart of control according to the first embodiment.

A time chart of the control by the parking brake control apparatus 4 according to the first embodiment will be described with reference to FIG. 5, in association with the respective steps in the above-described control flowchart illustrated in FIG. 4.

At time (A), the electric motor 5 stops operating. At time (B), the parking brake switch 7 is pushed to the release side. Then, according to the determination of step S1, a current in the release direction starts to be supplied to the electric motor 5. At this time, the brake operation status, which indicates a control state of the parking brake control apparatus 4, shifts from the locked state to the release ongoing state.

From time (B) to time (D), the motor current value gradually increases for a larger torque to cause a rotation of the electric motor 5. At this time, the electric motor 5 does not rotate yet. At time (D), when the electric motor 5 starts to rotate in the release direction, the motor current value hits a peak value. Then, the motor current differential value, which indicates an increase rate of the current value, increases from time (B) to then reach a peak value, and after that; suddenly reduces to approach 0 at time (D). During this period, the parking brake control apparatus 4 determines whether the motor current value exceeds the threshold value A1 in step S4. After time (C) when the condition of step S4 is satisfied, the parking brake control apparatus 4 starts the determination of step S5 to determine whether the motor current value is equal to or smaller than the threshold value A1.

From time (D) to time (G), the electric motor 5 rotates in the release direction while receiving a load of a brake force via the piston 32. As the electric motor 5 rotates in the release direction, the load of the brake force gradually reduces, so the motor current value starts to reduce from the peak value at time (D) to approach 0. Then, during this release, the motor current value reaches or fails below the threshold value A1, which is the above-described determination condition of step S5. At time (B), the parking brake control apparatus 4 determines that the electric motor 5 has started to rotate.

After chat, further, the motor current value reaches or falls below the threshold value A2, which is the above-described determination condition of step S6. At time (G) when the current differential absolute value reaches or falls below the predetermined value ΔA1, which is the above-described determination condition of step S7, the parking brake control apparatus 4 determines that at least one of the pair of inner and outer brake pads 21 and 22 is separated from the disc rotor 20 (the brake force is released). In the present embodiment, the parking brake control apparatus 4 uses two determination conditions, i.e., the determination conditions of steps S6 and S7 to correctly determine whether the brake pad 21 or 22 is separated from the disc rotor 20. However, the present invention is not limited thereby. The parking brake control apparatus 4 may make this determination using any one of the determination conditions. More specifically, the parking brake control apparatus 4 may make this determination at time (F) when the motor current value reaches or fails below the threshold value A2 in step S6 during the release operation, as a condition to determine that at least one of the inner and outer brake pads 21 and 22 is separated from the disc rotor 20. Alternatively, without making the determination of step S6, the parking brake control apparatus 4 may determine the separation of the brake pad from the disc rotor 20 only when the current differential absolute value becomes 0 (equal to or smaller than the predetermined value ΔA1) in step S7. Further alternatively, a thrust sensor may be provided to the disc brake 2 equipped with the parking brake, and the parking brake control apparatus 4 may monitor a brake force with use of the thrust sensor and determine that at least one of the pair of inner and outer brake pads 21 and 22 is separated from the disc rotor 2 based on the detection values from time (D) when a brake force is generated with the disc rotor 20 sandwiched between the inner and outer pads 21 and 22 to time (G) corresponding to the separation (a release of the brake force).

From time (G), the electric motor 5 continues rotating in the release direction, but this rotation is almost a rotation without a load applied thereto since at least one of the pair of inner and outer brake pads 21 and 22 is separated from the disc rotor 2. Therefore, the motor current value is maintained at the no-load current value, and the current differential absolute value is maintained at about 0. Accordingly, the parking brake control apparatus 4 starts to integrate the motor rotational speed (step S8) after time (G) corresponding to the determination of step S7, i.e., after the current differential absolute value becomes 0 (equal to or smaller than the predetermined value ΔA1) during the release operation.

During the release operation, from time (G) to time (H), the parking brake control apparatus 4 integrates the motor rotational speed. At time (H), when the parking brake control apparatus 4 determines in step S9 that the integrated value (a shaded area (X) in FIG. 5) reaches the predetermined value X1 corresponding to the predetermined rollback amount of the piston 32 calculated in advance or more, the parking brake control apparatus 4 stops the electric motor 5 (step S10), thereby completing the parking brake release operation. Then, the brake operation status of the parking brake control apparatus 4 shifts from the release ongoing state to the unlocked state.

In this way, according to the present embodiment, after the parking brake control apparatus 4 detects that at least one of the brake pads 21 and 22 is separated from the disc rotor 20, when the integrated value of the motor rotational speed reaches the predetermined value X1 corresponding to the predetermined rollback, amount of the piston 32 calculated in advance or more, i.e., the electric motor 5 is driven by a predetermined amount based on the electric value (the integrated value of the motor rotational speed reaches the predetermined value X1), the parking brake control apparatus 4 stops the electric motor 5. Therefore, it is possible to generate an appropriate clearance amount between the piston and the thrust, member at the time of an end of a parking brake release operation. As a result, it is possible to prevent a brake drag from occurring without sacrificing the responsiveness at the time of application of the parking brake.

Second Embodiment

Figure 6:
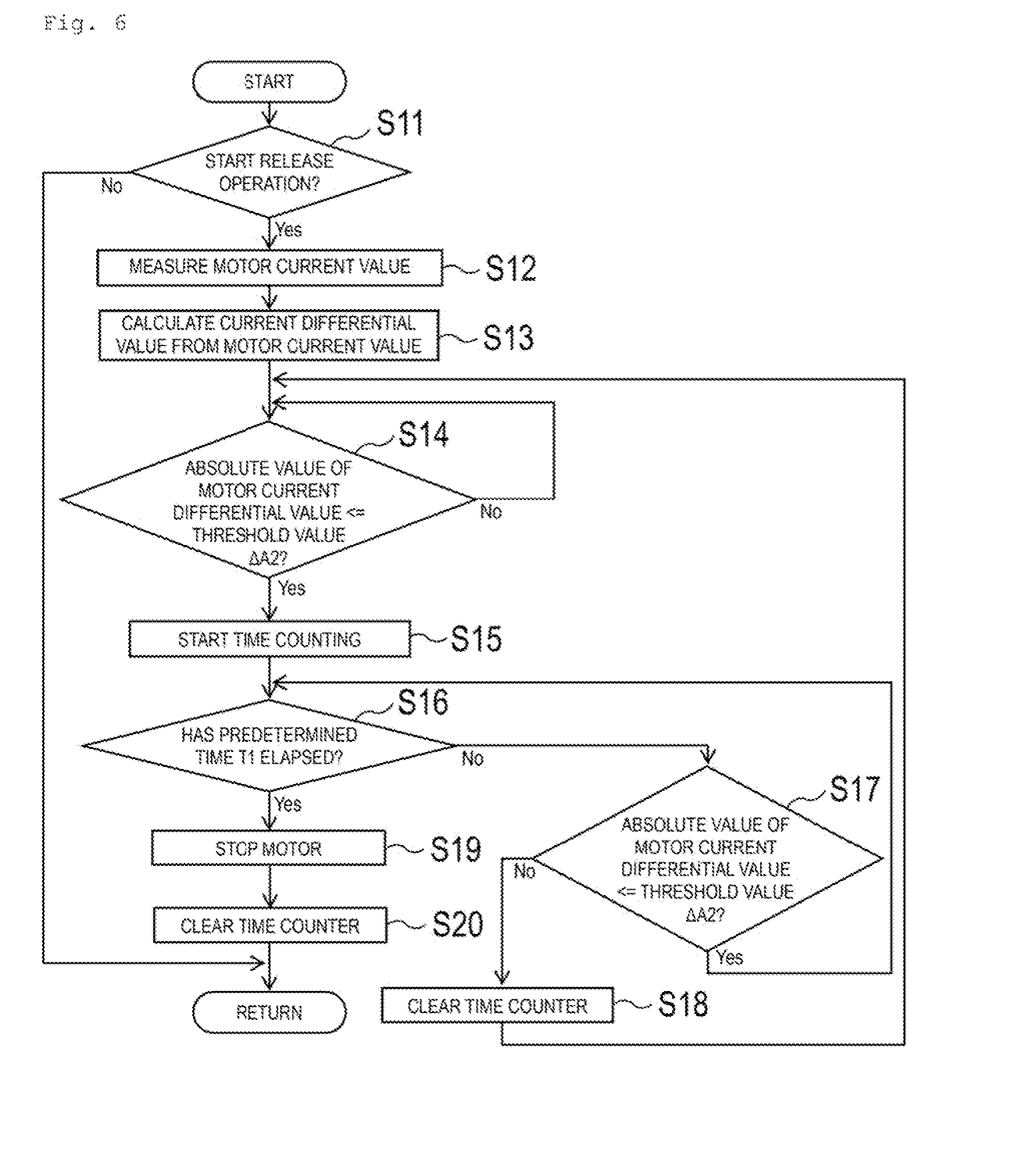
FIG. 6 is a control flowchart illustrating a release operation according to a second embodiment of the parking brake control apparatus.

Next, a control flow by the parking brake control apparatus 4 according to the second embodiment will be described in detail with reference to FIG. 6. First, in a similar manner to steps S1 and S2 in FIG. 3, in step S11, the parking brake control apparatus 4 determines whether to start a parking brake release operation. If this condition is satisfied, a current starts to be supplied to the electric motor 5. Then, the processing proceeds to step S12. If this condition is not satisfied, the routine is ended.

In step S12, the motor current value detector 6 starts to measure the current value supplied to the electric motor 5. After that, the motor current value detector 6 measures the current value at predetermined intervals. In step S13, the parking brake control apparatus 4 calculates a differential value of the measured, motor current value.

Next, in step S14, the parking brake control, apparatus 4 determines whether the current differential absolute value reaches or fails below the predetermined value ΔA2. The parking brake control apparatus 4 repeats the determination of step S14 until this condition is satisfied, if the condition is satisfied, the processing proceeds to step S15. In step S15, once the current differential absolute value reaches or falls below the predetermined value ΔA2, time counting is started. In step S16, the parking brake control apparatus 4 determines whether a value of a time counter reaches a predetermined time T1. The predetermined value ΔA2 is set to a value slightly larger than 0 to detect that at least one of the brake pads 21 and 22 is separated from the disc rotor 20 and no load is applied to a rotation of the electric motor 5 in a similar manner to the first embodiment. Further, the above-described predetermined time T1 is set to a time required for the thrust member 44 to move by a distance corresponding to the rollback amount of the piston 32 or more. More specifically, the predetermined value X1 is set as a travel time of the thrust member 44 corresponding to a clearance amount between the piston 32 and the thrust member 44 sufficient to prevent a drag of the pad from occurring in consideration of a predetermined rollback amount of the piston 32 by the piston seal 31 to which a hydraulic pressure is applied during a normal brake operation, a maximum value of a thermal expansion amount generated when the inner and outer brake pads 21 and 22 are heated, and a maximum value of a face deflection amount of the disk rotor 20 while the vehicle is running.

In the determination of step S16, the condition is not immediately satisfied since the predetermined time T1 is a sufficiently longer time than a control cycle. Therefore, the parking brake control apparatus 4 determines that the condition is not satisfied, and then the processing proceeds to step S17. In step S17, the parking brake control apparatus 4 determines again whether the current differential absolute value reaches or fails below the predetermined value ΔA2. If this condition of step S17 is satisfied, the processing proceeds to step S16 again, in which the parking brake control apparatus 4 determines the elapse of the time. If the condition of step S17 is not satisfied, i.e., the current differential absolute value exceeds the predetermined value ΔA2, the processing proceeds to step S18, in which the value of the time counter is cleared. Then, the processing proceeds to step S14 again. The parking brake control apparatus 4 determines again whether the current differential absolute value reaches or fails below the predetermined value ΔA2, for the following reason. During a period from the start of the release operation to actual separation of the brake pad 21 or 22 from the disc rotor 20, the current differential absolute value reaches or falls below the predetermined value ΔA2 several times. In this case, the duration time when the current differential absolute value reaches or falls below the predetermined value ΔA2 is shorter than the predetermined time T1. Therefore, in a case where the current differential absolute value exceeds the predetermined value ΔA2 during the predetermined time T1, which is determined in step S16, the time counting is stopped and the determination is repeated.

Lastly, if the determination of step S16 indicates satisfaction of the condition, the processing proceeds to steps S19 and S20. In these steps, the parking brake control apparatus 4 stops the electric motor 5 and clears the value of the time counter. When the determination of step S16 indicates satisfaction of the condition, the parking brake control apparatus 4 determines that at least one of the pair of inner and outer brake pads 21 and 22 is separated from the disc rotor 20, and the thrust member 44 has moved to a position realizing such a clearance amount between the piston 32 and the thrust member 44 that no pad drag occurs.

Figure 7:
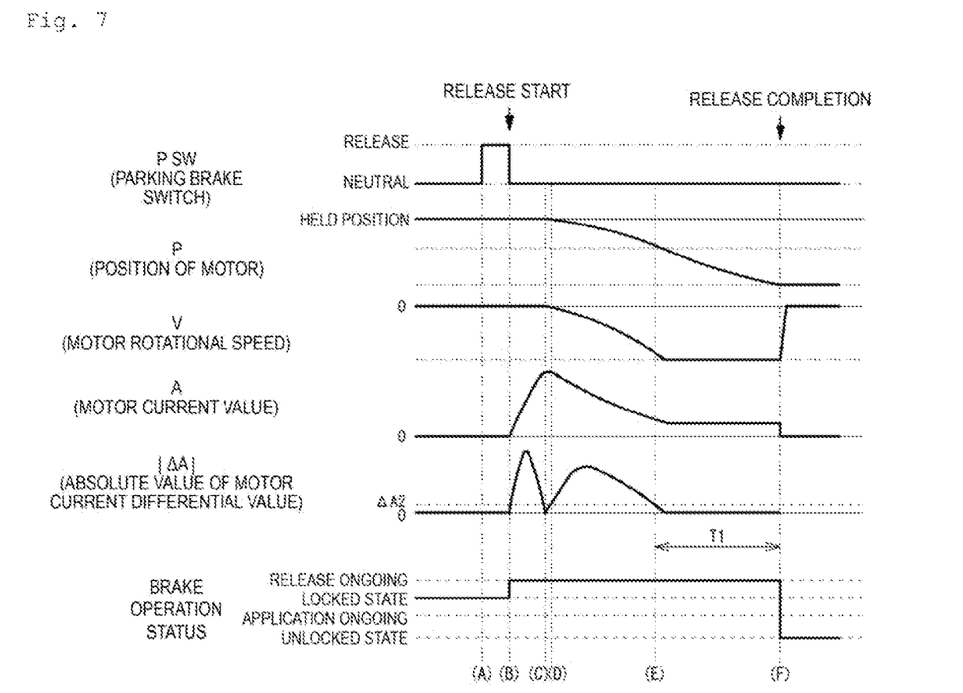
FIG. 7 is a time chart, of control according to the second embodiment.

Next, a time chart of the control flow by the parking brake control apparatus 4 according to the second embodiment will be described with reference to FIG. 7. In the time chart of the control flow according to the second embodiment, time (A) to time (B) are similar to the time chart of the control according to the first embodiment, so the descriptions thereof will be omitted below.

At time (B), since the current differential absolute value reaches or falls below the predetermined value ΔA2, time counting is started in the process of step S15. However, at this time, the current differential absolute value exceeds the predetermined amount ΔA2 immediately, so the time counting is stopped. In step S14, the parking brake control apparatus 4 repeats the determination of the current differential absolute value.

Next, at time (C), since the current differential absolute value reaches or falls below the predetermined value ΔA2 again, time counting is started in the process of step S15. However, the current differential absolute value exceeds the predetermined value ΔA2 immediately at time (D), so the time counting is stopped. Then, in step S14, the parking brake control apparatus 4 repeats the determination of the current differential absolute value.

Finally, at time (E), since the current differential absolute value reaches or falls below the predetermined value ΔA2, time counting is started in the process of step S15. After time (E), the brake pad 21 or 22 is separated from the disc rotor 20, and no load is applied to the rotation of the electric motor 5 any longer. Therefore, the time counter continues counting the time in the processes of steps S16 and S17. At time (F), the value of the time counter exceeds the predetermined time T1, so the determination of step S16 indicates satisfaction of the condition. Accordingly, the parking brake control apparatus 4 stops the electric motor 5 (step S19), thereby completing the parking brake release operation. Then, the brake operation status of the parking brake control apparatus 4 shifts from the release ongoing state to the unlocked state.

In this way, in the present embodiment, when the parking brake control apparatus 4 determines that at least one of the brake pads 21 and 22 is separated from the disc rotor 20 based on the current differential absolute value, and the value of the time counter reaches the predetermined time T1 required for the thrust member 44 to move by a distance corresponding to the rollback amount of the piston 32 or more, i.e., the electric motor 5 is driven by a predetermined amount based on the current value (the predetermined time T1 has elapsed after the current differential absolute value reaches the threshold value ΔA2), the parking brake control apparatus 4 stops the electric motor 5. Therefore, it is possible so generate an appropriate clearance amount between the piston and the thrust member at the time of an end of a parking brake release operation. As a result, it is possible to prevent a brake drag from occurring without sacrificing the responsiveness at the time of application of the parking brake.

Third Embodiment

Figure 8:
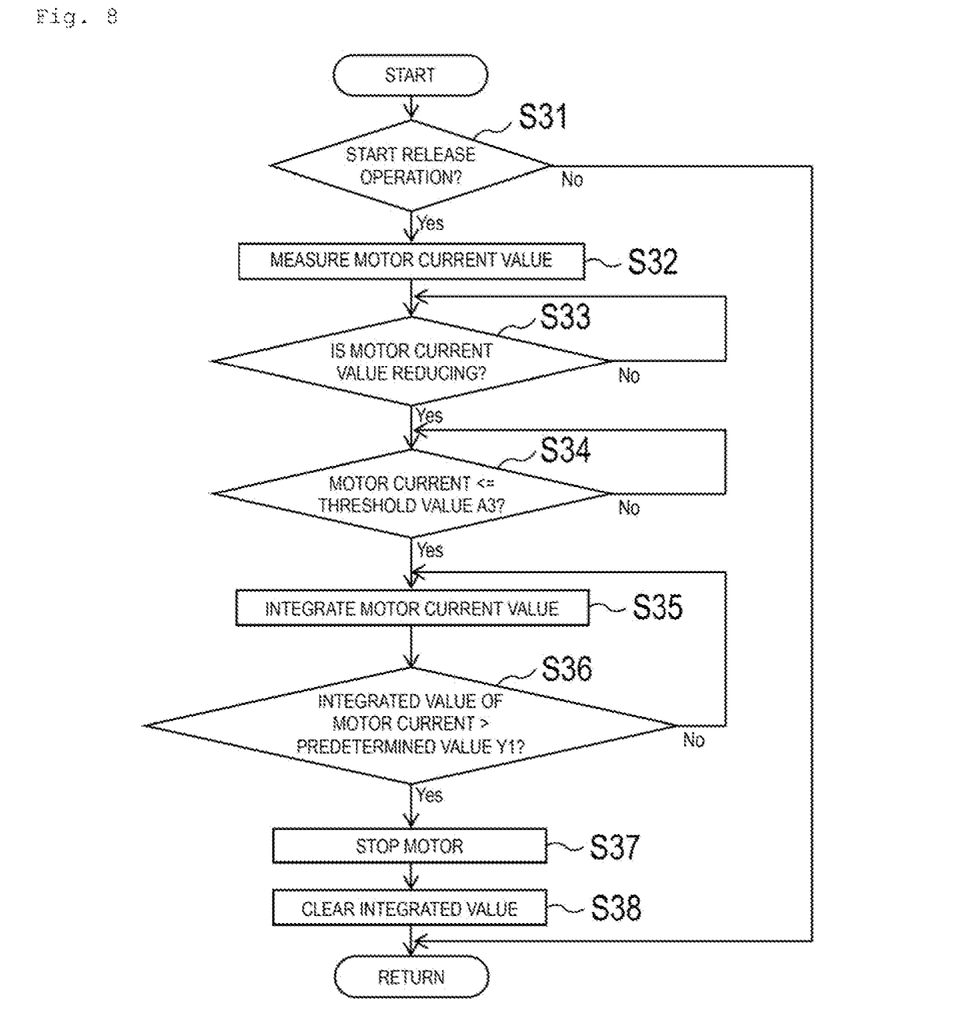
FIG. 8 is a control flowchart illustrating a release operation according to a third embodiment of the parking brake control apparatus.

Next, a control flow by the parking brake control apparatus 4 according to the third embodiment will be described in detail with reference to FIG. 8. First, in step S31, the parking brake control apparatus 4 determines whether to start a parking brake release operation. If this condition is satisfied, a current is supplied to the electric motor 5. Then, the processing proceeds to step S32. If the condition is not satisfied, she routine is ended. In step S32, the motor current value detector 6 starts to measure the current value supplied to the electric motor 5. The motor current value detector 6 measures the current value at predetermined intervals. In step S33, the parking brake control apparatus 4 determines whether the measured motor current value is reducing based on whether a differential value of the motor current value is a positive value or a negative value. The parking brake control, apparatus 4 repeats the determination of step S33 until this condition is satisfied. If the motor current value is reducing, this means that the electric motor 5 has started to rotate as described above, so the parking brake control apparatus 4 determines in step S33 whether the electric motor 5 has started to rotate. If the determination of step S33 results in satisfaction of the condition, the processing proceeds to step S34, in which the parking brake control apparatus 4 determines whether the motor current value reaches or falls below a threshold value A3. The parking brake control apparatus 4 repeats the determination of step S34 until this condition is satisfied. The threshold value A3 is set to a current value when at least one of the pair of inner and outer brake pads 21 and 22 is separated from, the disc rotor 20. The current value when at least one of the pair of inner and outer brake pad 21 and 22 is separated from the disc rotor 20 is calculated from an experiment in advance, and the threshold value A3 is set to a current value in consideration of an error.

Next, if the determination of step S34 results in satisfaction of the condition, the processing proceeds to step S35. In step S35, the parking brake control apparatus 4 integrates the motor current value after the motor current value reaches or falls below the threshold value A3, and calculates an integrated value therefrom. Then, in step S36, the parking brake control apparatus 4 determines whether the integrated value of the motor current value, which is calculated in step S35, exceeds a predetermined value Y1. The parking brake control, apparatus 4 repeats the calculation of step S35 and the determination of step S36 until the condition is satisfied. If the integrated value of the motor current value exceeds the predetermined value Y1 and the condition is satisfied in step S35, the processing proceeds to step S37, in which, the parking brake control apparatus 4 stops the electric motor 5. After that, in step S38, the parking brake control apparatus 4 clears the integrated value of the motor current value. In this way, completion of the release operation is determined, and the brake operation status of the parking brake control apparatus 4 is set into the unlocked state. The predetermined value Y1 is set to an integrated value of the motor current value corresponding to a movement amount of the thrust member 44 required for the thrust member 44 to move by a distance corresponding to a rollback amount of the piston 32 or more. More specifically, the predetermined value Y1 is set as a value corresponding to a clearance amount between the piston 32 and the thrust member 44 sufficient to prevent a drag of the pad from occurring in consideration of a predetermined rollback amount of the piston 32 by the piston seal 31 to which a hydraulic pressure is applied during a normal brake operation (an amount by which the piston 32 is retracted by the elastic recovery force of the piston seal 31), a maximum value of a thermal expansion amount generated when the inner and outer brake pads 21 and 22 are heated, and a maximum value of a face deflection amount of the disc rotor 20 while the vehicle is running.

Figure 9:
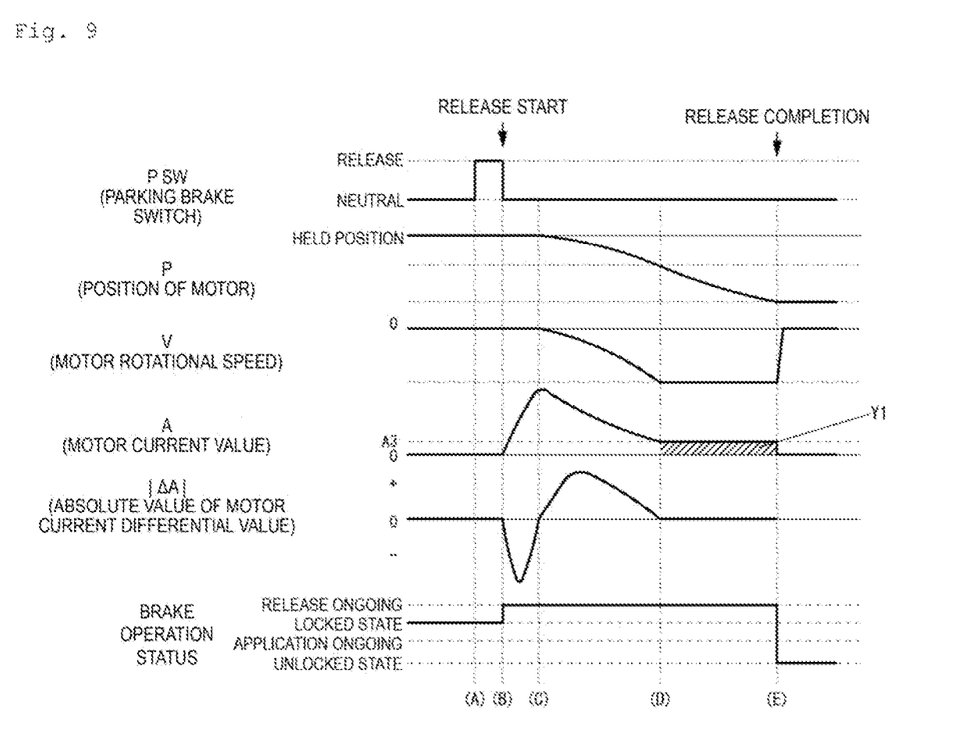
FIG. 9 is a time chart of control according to the third embodiment.

Next, a time chart of the control flow by the parking brake control apparatus 4 according to the third embodiment will be described with reference to FIG. 9. In the time chart of the control flow according to the third embodiment, time (A) to time (B) are similar to the time chart of the control flow according to the first and second embodiments, and therefore descriptions thereof will be omitted below.

At time (C), when the differential value of the motor current value turns into a positive value, the determination of step S33 results in satisfaction of the condition, and the parking brake control apparatus 4 determines that the electric motor 5 has started to rotate. Then, at time (D), when the motor current value reaches or fails below the threshold value A3, the determination of step S34 results in satisfaction of the condition, and the parking brake control apparatus 4 determines that the brake pad 21 or 22 is separated from the disc rotor 20.

Next, from time (D) to time (E), the parking brake control apparatus 4 integrates the motor current value in the process of step S35, and determines that the integrated value (a shaded portion Y1 in FIG. 9) reaches or exceeds the predetermined value Y1 corresponding to the predetermined rollback amount of the piston 32 in step S36. Then, at time (E), the parking brake control apparatus 4 stops the electric motor 5 in the process of step S37, and clears the integrated value of the motor current value in the processes of step S38, thereby completing the parking brake release operation. Then, the brake operation status of the parking brake control apparatus 4 shifts from the release ongoing state to the unlocked state.

In this way, in the present embodiment, the parking brake control apparatus 4 stops the electric motor 5 when the parking brake control apparatus 4 determines based on the motor current value that the brake pad 21 or 22 is separated from the disc rotor 20 and the integrated value of the motor current value exceeds the predetermined value Y1 required for the thrust, member 44 to move by a distance corresponding to the rollback amount of the piston 32 or more, i.e., the electric motor 5 is driven, to rotate by a predetermined amount based on the current value (the integrated value of the motor current value exceeds the predetermined value Y1). Therefore, it is possible to generate an appropriate clearance amount between the piston and the thrust member at the time of an end of a parking brake release operation. As a result, it is possible to prevent a brake drag from occurring without sacrificing the responsiveness at the time of application of the parking brake.

As described above, the disc brake apparatus 1 according to the above-described embodiments can realize an optimum clearance amount between the inner and outer brake pads 21 and 22 and the piston 32 without an excess and shortage, when driving the electric motor 5 in the release direction. Further, the disc brake apparatus 1 can set an optimum time period in which the electric motor 5 is driven from the motor current value at the time of a parking brake release operation, and therefore can be independent of an external influence (for example, a mechanical and structural variation, and a temperature characteristic).

According to the above-described respective embodiments, the disc brake apparatus includes the caliper configured to press the brake pads disposed on the respective surfaces of the disc by the piston disposed in the hydraulic cylinder, the piston thrust mechanism disposed at the caliper and including the thrust member configured to thrust she piston, by the electric motor, the piston holding mechanism configured to hold the thrust piston, and the control unit configured, to control driving of the electric motor. The control unit detects that the brake pad is separated from the disc after driving the electric motor to cause the piston holding mechanism to stop holding the piston, and then stops driving the electric motor after driving the electric motor by the predetermined amount based on the electric current value of the electric motor.

According to the above-described disc brake apparatus, it is possible to generate an appropriate clearance amount between the piston and the thrust member at an end of a parking brake release operation.

In the disc brake apparatus according to the above-described first and third embodiments, the predetermined amount, by which the electric motor is driven, is the integrated value of the detection value based on the electric current value of the electric motor after the control unit detects that the brake pad is separated from the disc.

According to the above-described disc brake apparatus, the control unit calculates the integrated value of the detection amount based, on the electric current value of the electric motor, whereby it is unnecessary to provide a special sensor for detecting a position of the electric motor and a position of the thrust member, leading to a simple structure of the disc brake apparatus and facilitating the manufacturing procedure.

In the disc brake apparatus according so the above-described first and third embodiments, the electric current value of the electric motor is an actual electric current value or an electric current instruction value.

In the disc brake apparatus according to the above-described first embodiment, the detection value is the rotational speed of the electric motor.

In the disc brake apparatus according to the above-described first embodiment, the rotational speed of the electric motor is calculated based on the electric current value while being corrected according to the voltage applied to the electric motor.

In the disc brake apparatus according to the above-described third embodiment, the detection value is the electric current value.

In the disc brake apparatus according to the above-described respective embodiments, the predetermined amount is a value corresponding to the movement amount required for the thrust member to move by a distance corresponding to the rollback amount of the piston or more after the brake pad is separated from the disc.

In the disc brake apparatus according to the above-described second embodiment, the predetermined amount, by which the electric motor is driven, is the predetermined time required for the thrust member to move by a distance corresponding to the rollback amount of the piston or more after the brake paid is separated from the disc.

In the disc brake apparatus according to the above-described one embodiment, the control unit detects chat the brake pad is separated from the disc based on a fact that the electric current value of the electric motor reaches or falls below the predetermined value.

According to the above-described disc brake apparatus, it is unnecessary to provide a special sensor for detecting separation of the brake pad from the disc, leading to a simple structure of the disc brake apparatus and facilitating the manufacturing procedure.

The disc brake apparatus according to one embodiment of the present invention, separation of the brake pad from the disc is detected based on a fact that the absolute value of the differential value of the electric current value of the electric motor reaches or falls below the predetermined value after the electric current value of the electric motor reaches or falls below the predetermined value.

According to the disc brake apparatus according to the above-described respective embodiments, it is possible to achieve an appropriate clearance amount between the piston and the thrust member at en end of a parking brake release operation.

Although only some exemplary embodiments of this invention, have been described in detail above, those skilled in the art will readily appreciate that many modifications are possible in the exemplary embodiments without materially departing from the novel teaching and advantages of this invention, accordingly, all such modifications are intended to be included, within the scope of this invention.

The present application claims priority to Japanese Patent Applications No. 2012-081535 filed on Mar. 30, 2012. The entire disclosure of No. 2012-081535 filed on Mar. 30, 2012 including specification, claims, drawings and summary is incorporated herein by reference in its entirety.

What is claimed is:

1. A disc brake apparatus comprising:
   a caliper configured to press brake pads disposed on respective surfaces of a disc by a piston disposed in a hydraulic cylinder;
   a piston thrust mechanism disposed at the caliper and including a thrust member configured to thrust the piston by an electric motor;
   a piston holding mechanism configured to hold the thrust piston; and
   a control unit configured to control driving of the electric motor,
   wherein the control unit detects that at least one of the brake pads is separated from the disc after driving the electric motor to cause the piston holding mechanism to stop holding the piston, and then stops driving the electric motor after driving the electric motor by a predetermined amount based on an electric current value of the electric motor,
   wherein the predetermined amount is an integrated value of a detection value based on the electric current value of the electric motor after the control unit detects that at least one of the brake pads is separated from the disc.

2. The disc brake apparatus according to claim 1, wherein the electric current value of the electric motor is an actual electric current value detected by a motor current detector which detects current values supplied to the electric motor.

3. The disc brake apparatus according to claim 1, wherein the detection value is a rotational speed of the electric motor.

4. The disc brake apparatus according to claim 3, wherein the rotational speed of the electric motor is calculated based on the electric current value while being corrected according to a voltage applied to the electric motor.

5. The disc brake apparatus according to claim 1, wherein the detection value is an electric current value detected by a motor current detector which detects current values supplied to the electric motor.

6. The disc brake apparatus according to claim 1, wherein the integrated value of the detection value is a value corresponding to a movement amount required for the thrust member to move by a distance corresponding to a rollback amount of the piston or more after at least one of the brake pads is separated from the disc.

7. The disc brake apparatus according to claim 1, wherein the control unit detects that at least one of the brake pads is separated from the disc based on a fact that the electric current value of the electric motor reaches or falls below a predetermined value.

8. The disc brake apparatus according to claim 1, wherein the control unit detects that at least one of the brake pads is separated from the disc based on a fact that an absolute value of a differential value of the electric current value of the electric motor reaches or falls below a predetermined value after the electric current value of the electric motor reaches or falls below the predetermined value.

9. A disc brake apparatus comprising:
   a caliper configured to press brake pads disposed on respective surfaces of a disc by a piston disposed in a hydraulic cylinder;
   an electric parking brake mechanism disposed at the caliper, and configured to thrust the piston by an electric motor and hold the thrust piston; and
   a control unit configured to control driving of the electric motor,
   wherein the control unit detects that at least one of the brake pads is separated from the disc after driving the electric motor to cause the piston holding mechanism to stop holding the piston, and then stops driving the electric motor after driving the electric motor by a predetermined amount based on an electric current value of the electric motor,
   wherein the predetermined amount, by which the electric motor is driven, is an integrated value of a detection value based on the electric current value of the electric motor after the control unit detects that at least one of the brake pads is separated from the disc.

10. The disc brake apparatus according to claim 9, wherein the electric current value of the electric motor is an actual electric current value detected by a motor current detector which detects current values supplied to the electric motor.

11. The disc brake apparatus according to claim 9, wherein the integrated value of the detection value is a value corresponding to a movement amount required for the thrust member to move by a distance corresponding to a rollback amount of the piston or more after at least one of the brake pads is separated from the disc.

12. The disc brake apparatus according to claim 9, wherein the control unit detects that at least one of the brake pads is separated from the disc based on a fact that the electric current value of the electric motor reaches or falls below a predetermined value.

13. The disc brake apparatus according to claim 9, wherein the control unit detects that at least one of the brake pads is separated from the disc based on a fact that an absolute value of a differential value of the electric current value of the electric motor reaches or falls below a predetermined value after the electric current value of the electric motor reaches or falls below the predetermined value.

14. The disc brake apparatus according to claim 9, wherein the electric current value is detected by a motor current detector which detects current values supplied to the electric motor.

15. A disc brake apparatus comprising:
a caliper configured to press brake pads disposed on respective surfaces of a disc by a piston disposed in a hydraulic cylinder;
an electric mechanism disposed at the caliper, and configured to move the piston toward the disc and move the thrust piston away from the disc by an electric motor; and
a control unit configured to control driving of the electric motor,
wherein, when the control unit moves the piston away from the disc, the control unit stops driving the electric motor after driving the electric motor by a predetermined amount based on an electric value of the electric motor after at least one of the brake pads is separated from the disc,
wherein the predetermined amount, by which the electric motor is driven, is an integrated value of a detection value based on the electric current value of the electric motor after the control unit detects that at least one of the brake pads is separated from the disc.

16. The disc brake apparatus according to claim 15, wherein the control unit detects that at least one of the brake pads is separated from the disc based on a fact that the electric current value of the electric motor reaches or falls below a predetermined value.

17. The disc brake apparatus according to claim 15, wherein the control unit detects that at least one of the brake pads is separated from the disc based on a fact that an absolute value of a differential value of the electric current value of the electric motor reaches or falls below a predetermined value after the electric current value of the electric motor reaches or falls below the predetermined value.

18. The disc brake apparatus according to claim 15, wherein the electric current value is an actual electric current value detected by a motor current detector which detects current values supplied to the electric motor.

19. The disc brake apparatus according to claim 15, wherein the electric current value is detected by a motor current detector which detects current values supplied to the electric motor.

* * * * *